US011765174B2

(12) United States Patent
Chanda et al.

(10) Patent No.: US 11,765,174 B2
(45) Date of Patent: Sep. 19, 2023

(54) IDENTITY-BASED ACCESS CONTROL FOR CLOUD APPLICATIONS

(71) Applicant: VMware, Inc., Palo Alto, CA (US)

(72) Inventors: Arijit Chanda, San Jose, CA (US); Venkat Rajagopalan, Palo Alto, CA (US); Rajiv Mordani, Palo Alto, CA (US); Arnold Poon, Palo Alto, CA (US); Rajiv Krishnamurthy, San Jose, CA (US); Farzad Ghannadian, Palo Alto, CA (US); Sirisha Myneni, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 189 days.

(21) Appl. No.: 16/213,545

(22) Filed: Dec. 7, 2018

(65) Prior Publication Data

US 2020/0186534 A1 Jun. 11, 2020

(51) Int. Cl.
*H04L 9/40* (2022.01)
*G06F 9/455* (2018.01)

(52) U.S. Cl.
CPC .......... *H04L 63/102* (2013.01); *H04L 63/205* (2013.01); *G06F 9/45533* (2013.01)

(58) Field of Classification Search
CPC ................. H04L 63/102; H04L 63/205; G06F 9/45533
See application file for complete search history.

(56) References Cited

U.S. PATENT DOCUMENTS

| | | | |
|---|---|---|---|
| 9,137,131 B1* | 9/2015 | Sarukkai | H04L 63/0815 |
| 10,362,059 B2* | 7/2019 | Handa | H04L 67/56 |
| 2014/0059226 A1* | 2/2014 | Messerli | H04L 67/51 |
| | | | 709/226 |
| 2015/0026794 A1* | 1/2015 | Zuk | H04L 45/64 |
| | | | 726/13 |
| 2016/0191413 A1* | 6/2016 | Feroz | G06F 16/9535 |
| | | | 709/229 |
| 2017/0171159 A1* | 6/2017 | Kumar | G06F 9/45558 |
| 2017/0237641 A1 | 8/2017 | Holeman et al. | |
| 2018/0275765 A1* | 9/2018 | Roth | G06F 3/0304 |
| 2019/0089678 A1* | 3/2019 | Lam | H04L 63/0245 |

* cited by examiner

*Primary Examiner* — Linglan Edwards
*Assistant Examiner* — Joshua Raymond White
(74) *Attorney, Agent, or Firm* — Kim & Stewart LLP

(57) ABSTRACT

Techniques for providing application-independent access control in a cloud-services computing environment are provided. In one embodiment, a method for providing application-independent access control is provided. The method includes obtaining a user identity for accessing the cloud-services computing environment and receiving a user request to perform a task using an application. The method further includes collecting process-related data for performing the task using the application and obtaining one or more network routing addresses. The method further includes determining, based on the user identity, the process-related data, and the one or more network routing addresses, whether the task is to be performed. If that the task is to be performed, the task is caused to be performed using the application; and if the task is not to be performed, the user request is denied.

21 Claims, 6 Drawing Sheets

| Src IP | Src Port | DST IP | Dst Port | User Info | File Info | Process Info | Supplying Agent |
|---|---|---|---|---|---|---|---|
| 1.1.1.1 | 80 | 2.2.2.2 | 443 | User A | NA | NA | Reverse Proxy |
| 2.2.2.2 | 8080 | 3.3.3.3 | 8000 | | | java.exe | Network Driver |
| | | | | | SSN_file.exe | java.exe | File driver |

FIG. 3B

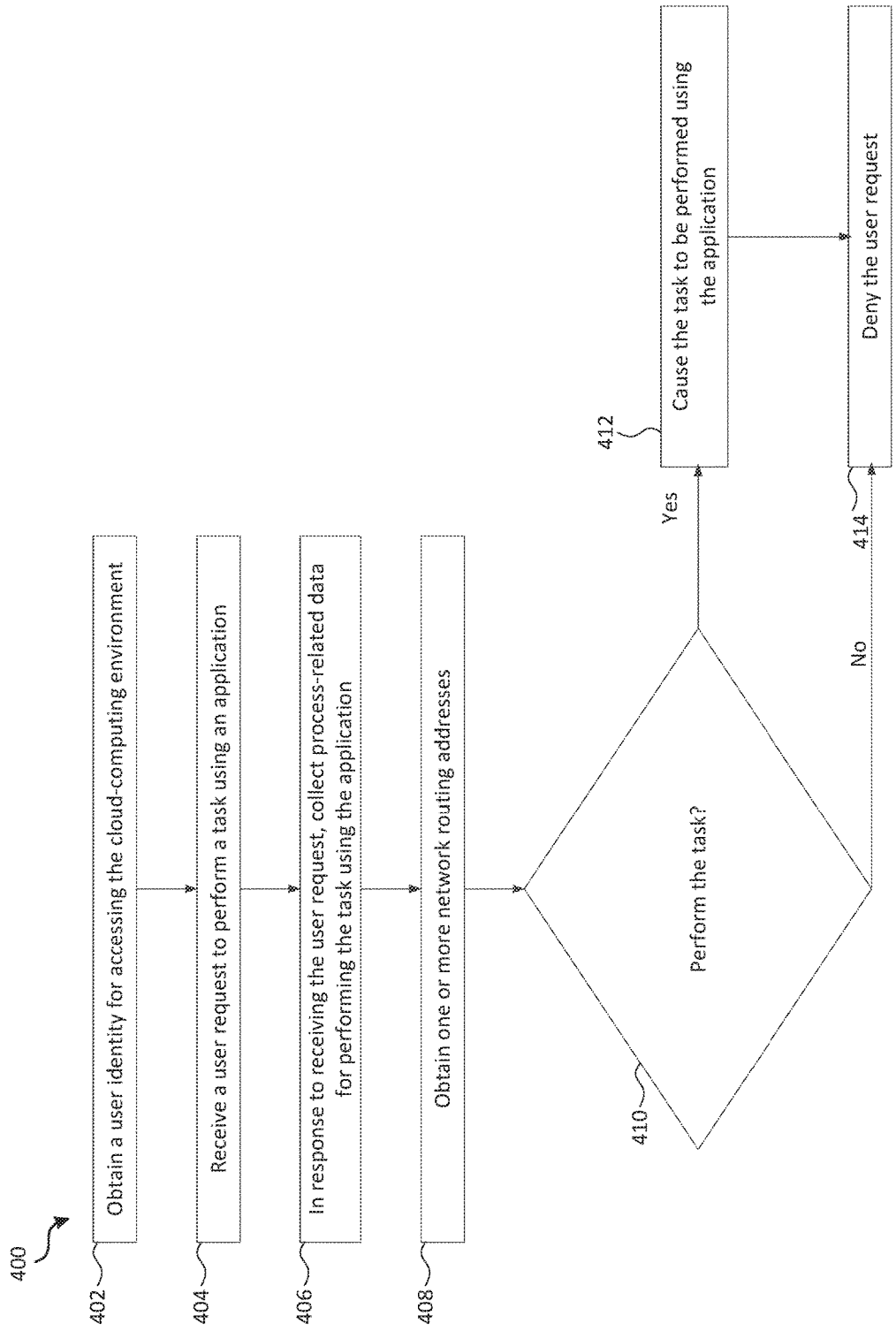

IDENTITY-BASED ACCESS CONTROL FOR CLOUD APPLICATIONS

FIELD

The present disclosure relates generally to cloud access security, and more specifically, to providing application-independent access control in a cloud-services computing environment.

BACKGROUND

Modern cloud-services computing environment is increasingly complex, and can include thousands of host computing devices, virtual machines (VMs) and networking components, servicing increasing numbers of clients. Data security of the cloud-services computing environment thus becomes important and sometimes critical. Data security can include, but is not limited to, ensuring confidential, valuable, and critical enterprise data are not compromised or leaked when cloud-based services are accessed. Under some circumstances, data security requires preventing or restricting a user from accessing the entire cloud-computing environment. For example, when a user is not associated with a particular business organization authorized to access the cloud-services computing environment, the user is prevented from accessing any cloud-based services provided to the particular business organization.

Under some circumstances, data security requires restricting a user from accessing a portion of, but not the entire, cloud-services computing environment. For example, assume documents (e.g., emails, files, databases, or the like) are stored on a share point in a cloud-services computing environment provided to a particular business organization. The organization's compliance policy may specify that any employee of the organization may access documents excluding those containing personally identifiable information (e.g., social security numbers or SSNs). The organization's compliance policy may further specify that an employee can access documents containing his or her own personally identifiable information (PII); and only human resource employees can access documents containing PII. Under these circumstances, conventional techniques for access control in a cloud-services computing environment are largely role-based control implemented by each individual application separately. As described in more detail below, data security can be improved using a totality of the circumstances approach with application-independent access control techniques.

Overview

Described herein are techniques for providing application-independent access control in a cloud-services computing environment. In one embodiment, a method for providing application-independent access control is provided at a host computing device operating in the cloud-services computing environment having one or more processors and memory. The method includes obtaining, at a first sub-system of the host computing device, a user identity for accessing the cloud-services computing environment. The method further includes receiving a user request to perform a task using an application. The application is configured to be accessed in the cloud-services computing environment. The method further includes in response to receiving the user request, collecting process-related data for performing the task using the application; and obtaining one or more source IP addresses and destination IP addresses. The method further includes determining, based on the user identity, the process-related data, and the one or more network routing addresses, whether the task is to be performed. The determining is performed at a second sub-system separate from a third sub-system configured to perform the task using the application. The method further includes in accordance with a determination that the task is to be performed responding to the user request, causing the task to be performed using the application.

In one embodiment, a non-transitory computer-readable storage medium storing one or more programs configured to be executed by a host computing device operating in a cloud-services computing environment having one or more processors and memory is provided. The one or more programs stored by the non-transitory computer-readable storage medium include instructions for obtaining, at a first sub-system of the host computing device, a user identity for accessing the cloud-services computing environment. The one or more programs further include instructions for receiving a user request to perform a task using an application. The application is configured to be accessed in the cloud-services computing environment. The one or more programs further include instructions for, in response to receiving the user request, collecting process-related data for performing the task using the application; and obtaining one or more source IP addresses and destination IP addresses. The one or more programs further include instructions for determining, based on the user identity, the process-related data, and the one or more network routing addresses, whether the task is to be performed. The determining is performed at a second sub-system separate from a third sub-system configured to perform the task using the application. The one or more programs further include instructions for in accordance with a determination that the task is to be performed responding to the user request, causing the task to be performed using the application.

In one embodiment, a system for application-independent access control in a cloud-services computing environment is provided. The system includes one or more processors and memory storing one or more programs configured to be executed by the one or more processors. The one or more programs stored by the non-transitory computer-readable storage medium include instructions for obtaining, at a first sub-system of the host computing device, a user identity for accessing the cloud-services computing environment. The one or more programs further include instructions for receiving a user request to perform a task using an application. The application is configured to be accessed in the cloud-services computing environment. The one or more programs further include instructions for, in response to receiving the user request, collecting process-related data for performing the task using the application; and obtaining one or more source IP addresses and destination IP addresses. The one or more programs further include instructions for determining, based on the user identity, the process-related data, and the one or more network routing addresses, whether the task is to be performed. The determining is performed at a second sub-system separate from a third sub-system configured to perform the task using the application. The one or more programs further include instructions for in accordance with a determination that the task is to be performed responding to the user request, causing the task to be performed using the application.

BRIEF DESCRIPTION OF THE DRAWINGS

FIG. 3B is a diagram illustrating a data structure used by a correlation engine for correcting the data structure to an access-control policy, in accordance with some embodiments.

FIGS. 4A-4B illustrates flowcharts of exemplary processes for application-independent access control in a cloud-services computing environment, in accordance with some embodiments.

DETAILED DESCRIPTION

Figure 1B:
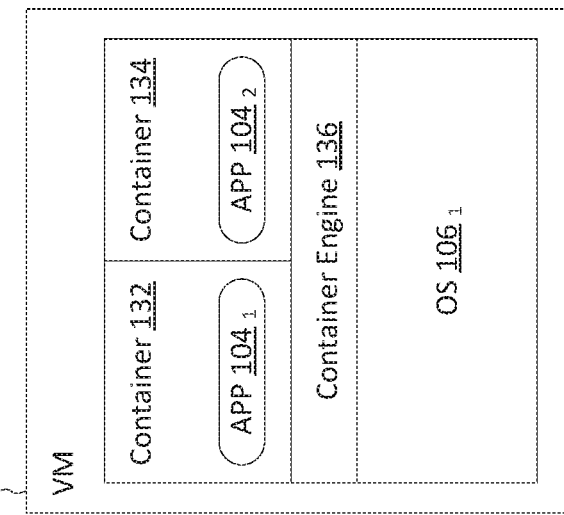
FIG. 1B is a block diagram illustrating a containerized application framework for implementing various components of a distributed-computing system, in accordance with some embodiments.

In the following description of embodiments, reference is made to the accompanying drawings in which are shown by way of illustration specific embodiments that can be practiced. It is to be understood that other embodiments can be used and structural changes can be made without departing from the scope of the various embodiments.

As described above, existing techniques for access control in a cloud-services computing environment are largely role-based control implemented by each individual application. As an example, a client computing device may initiate an application program interface (API) call that uses hypertext transfer protocol (HTTP) requests to generate (e.g., a POST request) a record of employee data using a database application. The database application typically implements role-based access control (RBAC) logics on the API to comply with the employer's compliance policy (e.g., only human resource (HR) users are permitted to generate a record of employee data). As another example, a client computing device may initiate an API call that uses HTTP requests to retrieve (e.g., a GET request) a record of employee data using the database application. The application typically then implements additional logics to control the access such that if a non-HR user is requesting to access the record, personally identifiable information (PII) is redacted or obfuscated for all employees except the user himself or herself. These existing techniques rely on each individual application to perform access control.

Some of existing applications for access control in a cloud-services computing environment also perform after-the-fact control. For example, using a cloud storage application, a user of an organization may upload a document to the organization's share point in the cloud-services computing environment. The document, however, may contain confidential information that is not to be shared outside of the organization. Typically, an application for responding to the API call to upload the document can only scan the document after the document is uploaded.

The techniques described in this application perform user identity based access control using guest introspection (GI) services, which at least partially offload the security functions to a dedicated security control system. In particular, the GI services can be provided using a correlation engine and other components operating on a service virtual machine (VM) that is separate and distinct from applicant VMs. For example, a service VM is a dedicated VM for performing access control. As discussed in more detail below, a service VM does not overlap with application VMs. An application VM accepts API calls for performing tasks using applications that can be instantiated in the application VM. Unlike an application VM, a service VM does not accept an API call to perform a task using an application. Rather, it is a dedicated VM for controlling access to the applications that can be instantiated in the applications VMs. Moreover, GI agents can be installed or instantiated in the application VMs to collect data for the correlation engine of a service VM. The correlation engine can thus perform access control based on the data collected by the GI agents and by other VMs. As a result, access control of the cloud-services computing environment is provided independently from the applications. And because the access control does not rely on each individual application, the protection of confidential information is significantly enhanced.

Moreover, in contrast to the existing role-based access control techniques, the access control techniques described in this application use more of a totality of the circumstances approach, by controlling access based on the user identity, the network routing addresses, and the process-related data. The totality of the circumstances approach thus provides an enhanced protection against leaking or compromising confidential information. In addition, the totality of the circumstances approach also enables real-time access control as soon as the virtual machines are instantiated and before any task is performed. For example, process-related data enables the correlation engine to determine, before actually performing a task (e.g., before initiating an instance of an application or before upload/download a file), whether the task should be performed in the first place. In contrast, existing techniques often perform after-the-fact control. As described above, existing techniques rely on each application itself for performing RBAC. Thus, an instance of the application often must be initiated first in order to perform the control. Another after-the-fact control example relates to allowing a user (even an unauthorized user) to upload a file to a share point first and then determines whether the uploaded file contains confidential information. By using the techniques described in this application, the after-the-fact control is avoided or significantly reduced. The security of confidential information is thus greatly enhanced.

Moreover, the access control techniques described in this application permit one or more service VMs to perform access control for any number of application VMs operating on one or more host computing devices in the cloud-services computing environment. For example, each host computing device in the cloud-services computing environment can have its own service VM for controlling access to applications available on multiple application VMs. In some examples, multiple host computing devices can share a service VM for controlling access to applications available on multiple application VMs running on multiple host computing devices. As a result, the techniques described in this application facilitate global access control and enforcement, rather than controlling access by each individual application. This not only improves security of confidential information protection, but also significantly enhances overall operational efficiency of the systems in the cloud-services computing environment.

Figure 1A:
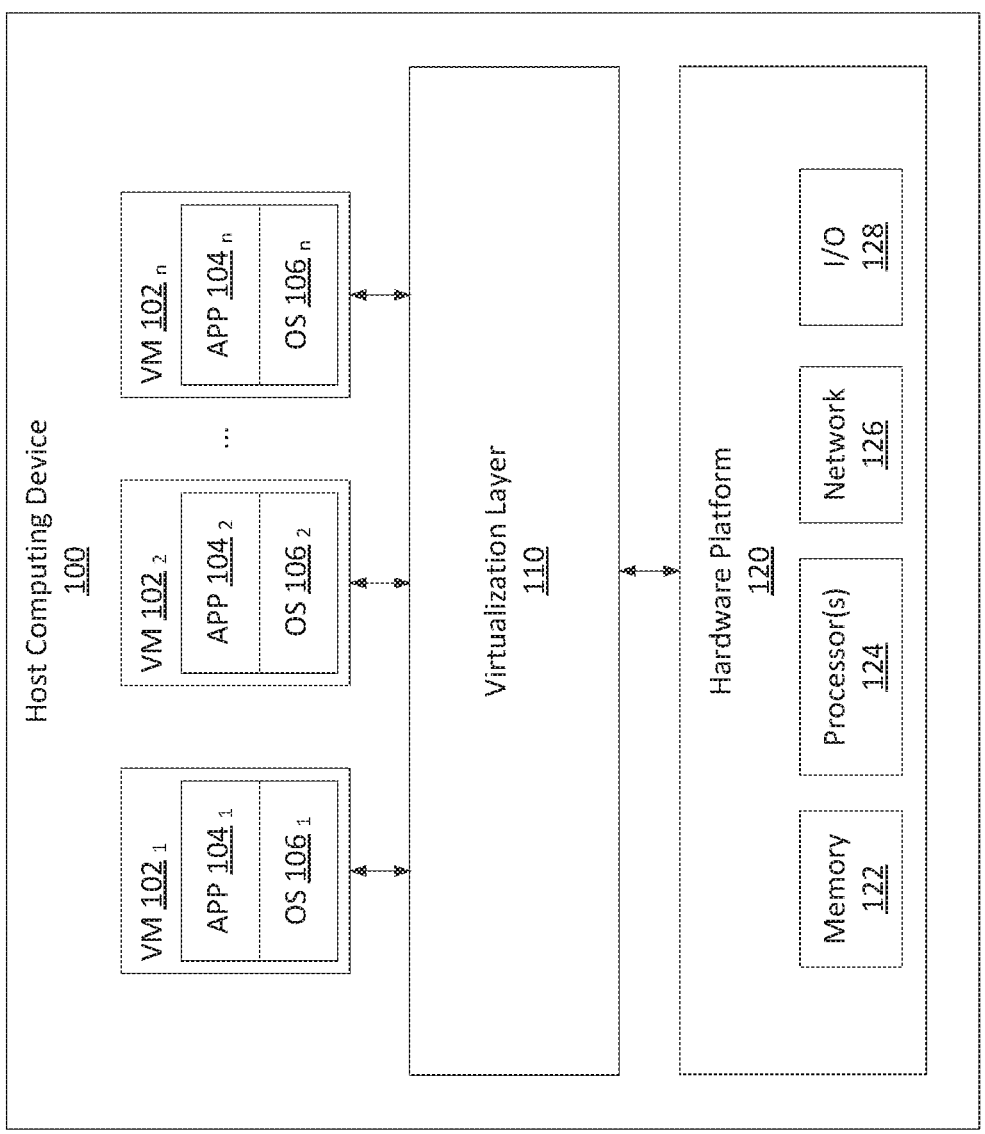
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1, virtual machines (VMs) $102_1$, $102_2 \ldots 120_n$ are instantiated on host computing device 100. In some embodiments, host computing device 100 implements one or more elements of a distributed-computing system (e.g., a distributed-computing system operating in a client computing environment and/or a cloud-services computing environment described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (e.g., programs containing software code) and the hardware resources used to execute or run applications. However, in this case, the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (e.g., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
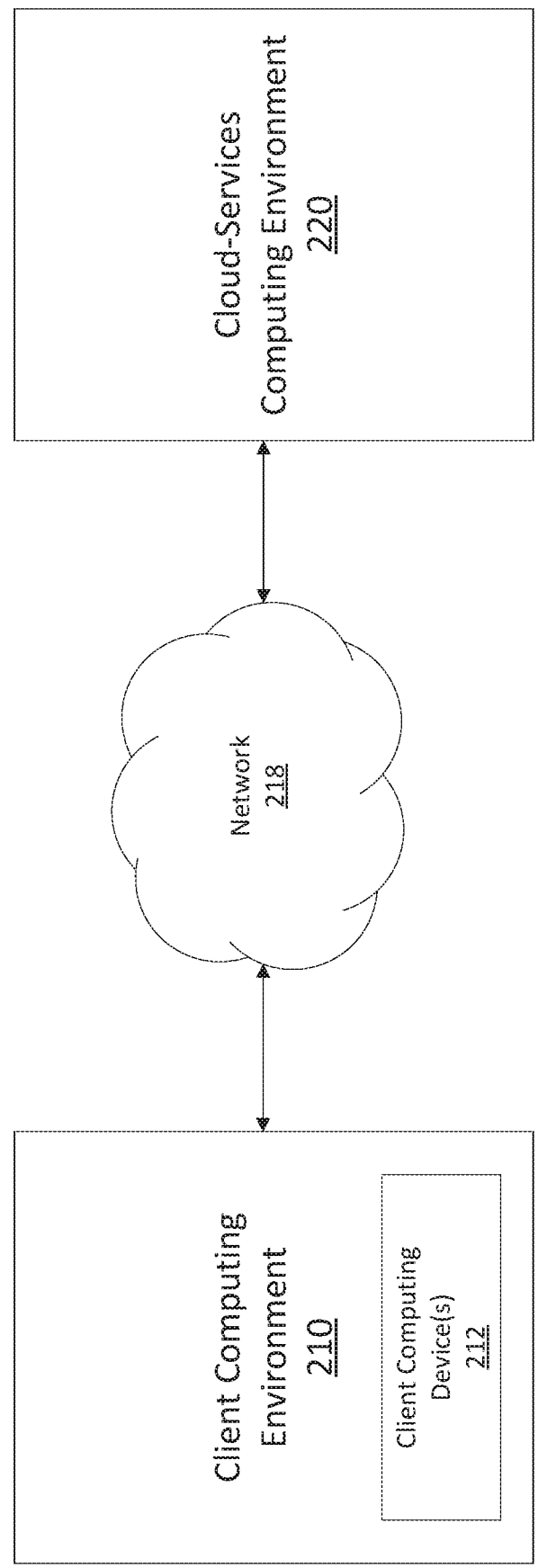
FIG. 2 is a block diagram illustrating systems and environments for communicating between a client computing environment and a cloud-services computing environment, in accordance with some embodiments.

FIG. 2 illustrates systems and environments for communicating between a client computing environment 210 and a cloud-services computing environment 220, in accordance with some embodiments. As shown in FIG. 2, client computing environment 210 can include one or more client computing device(s) 212. Client computing device(s) 212 can be implemented by, for example, host computing device 100 as described above, and thus can operate one or more virtual machines. In some embodiments, based on a user input received at a user interface (e.g., a login interface), client computing device 212 can obtain a user identity for accessing cloud-services computing environment 220. The user identity can include user credentials such as a user name, a password, a passcode, a pin number, finger prints, biometric identifications, or the like. In some embodiments, client computing device 212 can also obtain a user request for performing a task using an application available in cloud-services computing environment 220. For example, a user request can be an API call that uses HTTP requests to retrieve a data record (e.g., a GET request), to store a data record (e.g., a PUT request), to generate a new data record (e.g., a POST request), or to remove a data record (e.g., a DELETE request). An application can be a software or program (e.g., software code or a group of instructions) that, when executed, performs certain functions, tasks, and/or activities. A process can be an instance of an application or a portion of an instance of an application. An application or a portion thereof can be instantiated to form a process. For example, an application can be instantiated to form one or more processes that, when executed, performs various data manipulation tasks based on the user request (e.g., GET, PUT, POST, DELETE).

In some embodiments, client computing environment 210 can be a private network operating within an on-premise client's network infrastructure. An on-premise client's network infrastructure can include networks operating at one or more physical locations of a client (e.g., a company or a business organization) and typically operates behind a firewall. As a result, unauthorized communication with systems operating in client computing environment 210 can be blocked or filtered.

In some embodiments, systems operating in client computing environment 210 can initiate communication with other computing environments (e.g., cloud-services computing environment 220) outside of the on-premise client's network infrastructure. For example, systems operating in client computing environment 210 (e.g., client computing device(s) 212) can establish a persistent connection (e.g., HTTP, HTTP/2, TCP, and/or UDP connection) with cloud-services computing environment 220 (e.g., a private/public network operating at the cloud service provider's locations) via network 218 (e.g., a public network such as Internet) to deliver data (e.g., user credentials, user requests, etc.) for processing, analyzing, and/or storing by systems operating in cloud-services computing environment 220. Client computing environment 210 and cloud-services computing environment 220 can include two separate networks that do not overlap, and can be separated by a public network (e.g., network 218). While the two computing environments 210 and 220 can be operating in separate networks, data can be delivered across network boundaries from one computing environment to another. As illustrated in FIG. 2, client computing device(s) operate in client computing environment 210, which is a separate network from cloud-services computing environment 220. Thus, client computing devices are external to cloud-services computing environment 220.

In some embodiments, for data security, access control to cloud-services computing environment 220 is performed by one or more systems operating in cloud-services computing environment 220. As described in more detail below, such access control can be user identity based and application independent, while taking into consideration of the totality the circumstance. Such access control can also be real time or substantially real time, before a task is performed in response to the user request.

Figure 3A:
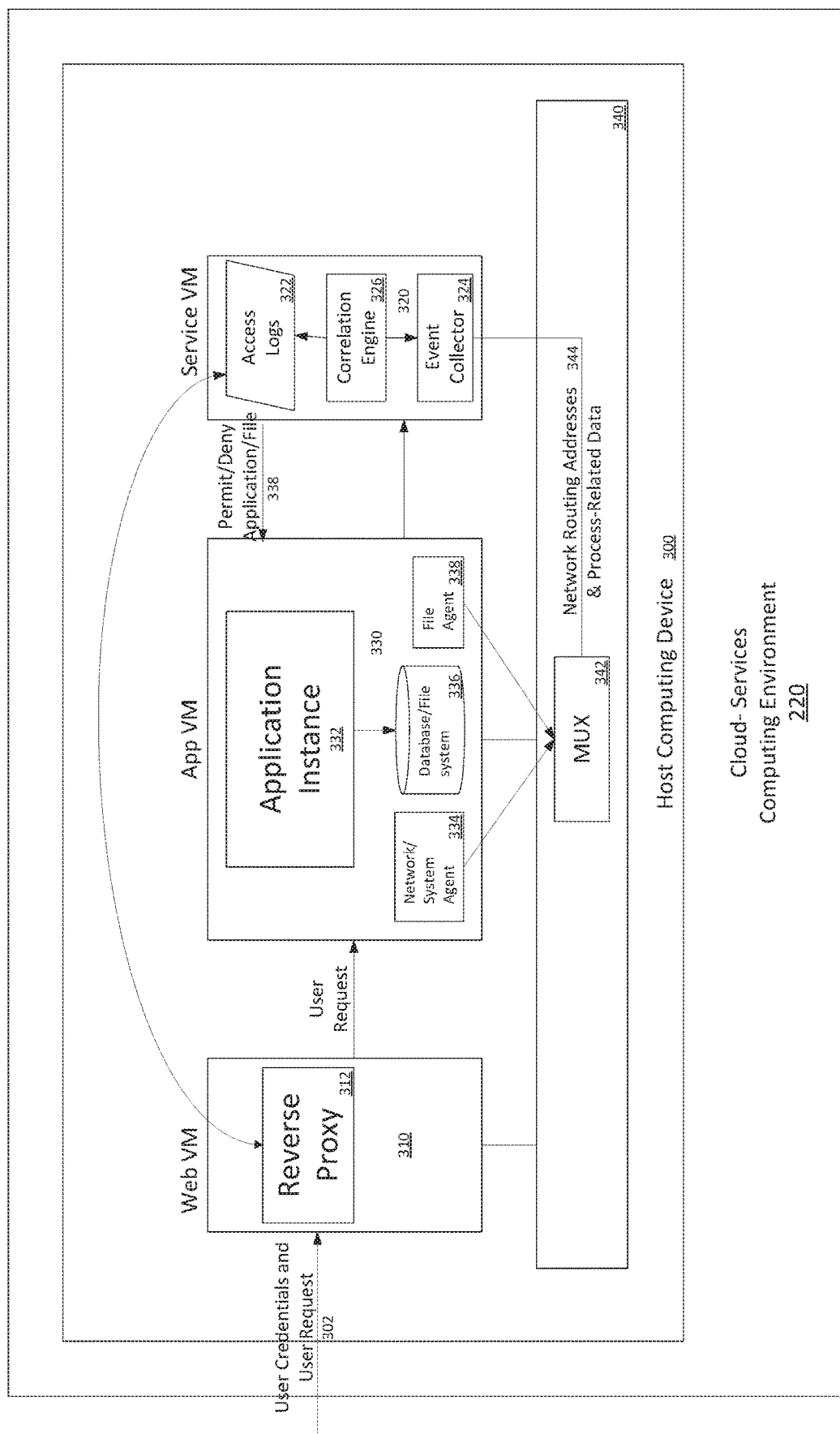
FIG. 3A is a block diagram illustrating systems and environments for application-independent access control in a cloud-services computing environment in accordance with some embodiments.

FIG. 3A is a block diagram illustrating host computing device 300 operating in cloud-services computing environment 220. In some embodiments, host computing device 300 can be implemented by using host computing device 100 described above. As illustrated in FIG. 3A, host computing device 300 can include a first sub-system 310, a second sub-system 320, a third sub-system 330, and a fourth sub-system 340. In some embodiments, first sub-system 310 includes one or more virtual machines (e.g., a web VM) operating a reverse proxy 312. Reverse proxy 312 is a proxy used as a front end of cloud-services computing environment 220 to control access to cloud-services computing environment 220. In some embodiments, reverse proxy 312 receives data (e.g., user requests and/or user credentials) from the network external to cloud-services computing environment 220. A network external to cloud-services computing environment 220 can include private networks and/or public networks that do not overlap with cloud-services computing environment 220 (e.g., client computing environment 210). For example, as described above, client computing environment 210 and cloud-services computing environment 220 can include two separate networks that do not overlap, and can be separated by a public network (e.g., network 218). While the two computing environments 210 and 220 can operate in separate networks, data can be delivered across network boundaries from one computing environment to another. For example, as discussed above with respect to FIG. 2, client computing device(s) 212 can receive user credentials and/or user requests. The user requests can be requests for performing tasks using an application accessible or available in cloud-service computing environment 220. Subsequently, client computing device(s) 212 can transmit the user credentials and/or user requests to reverse proxy 312 through network 218.

With reference to FIG. 3A, in some embodiments, first sub-system 310 receives user credentials and user request 302 for accessing cloud-services computing environment 220. First sub-system 310 can forward a representation of user credentials to a second sub-system 320. In some embodiments, second sub-system 320 is separate and distinct from first sub-system 310 (e.g., sub-systems 310 and 320 are separate and distinct virtual machines Separate and distinct sub-systems can operate independently from one another and do not overlap with one another. Separate and distinct sub-systems can communicate with one another to transmit and receive data. Separate and distinct sub-systems can be different sub-systems configured to perform different tasks. For example, as described above, first sub-system 310 is configured to be a front-end system to provider an interface for data communication between cloud-services computing environment 220 and networks/devices external to environment 220. Second sub-system 320 is configured to perform application-independent access control for cloud-services computing environment 220. And as described below, a third sub-system 330 is configured to instantiate and operate one or more applications (e.g., database applications). In some embodiments, the tasks performed by different sub-systems do not overlap. For example, second sub-system 320 may not instantiate or operate an application. Second sub-system 320 may be dedicated to perform access control to the applications operating in cloud-services computing environment 220, as described in more detail below.

In some embodiments, second sub-system 320 can include a service virtual machine (service VM) that provides guest introspection (GI) services. A GI service can at least partially or entirely offload the security functions (e.g., access control performed by each individual application in application VMs) to a dedicated security control system operating in one or more host computing devices. For example, a GI service can be provided by second sub-system 320 operating in host computing device 300, thereby offloading the security functions performed by applications (e.g., application instance 332) available on host computing device 300. As discussed in more detail below, using the GI service, virtual machines operating in host computing device 300 can be protected by real-time inspection (e.g., as soon as the virtual machines are instantiated). The GI service thus reduces risk of compromising confidential information, and reduces administrative and guest memory overheads. As a result, the overall operational efficiency of host computing device 300 is improved.

With reference to FIG. 3A, in some embodiments, second sub-system 320 receives a representation of user credentials (e.g., a message containing the user credentials) and stores the representation of user credential and optionally other relevant data in access logs 322. For example, based on the representation of user credentials, second sub-system 320 can store the user identity (e.g., user name, password, pin number, passcode, fingerprint data, other biometric data, etc.) in access log 322. The user identity stored in access log 322 can be used by the correlation engine 326 for performing application-independent access control, as described in more detail below.

In some embodiments, in addition to receiving user credentials and user request 302, reverse proxy 312 can obtain one or more network routing addresses associated with the user request. For example, reverse proxy 312 can obtain a source IP address, a destination IP address, a source port, and/or a destination port associated with the user request transmitted by a client computing device. As one example, the source IP address can be the IP address of a client computing device (e.g., client computing device 212) that transmits the user request (e.g., 1.1.1.1); the destination IP address can be the IP address of reverse proxy 312 (e.g., 2.2.2.2); the source port can be a port of the client computing device (e.g., port #80); and the destination port can be a port of reverse proxy 312 (e.g., port #443). Reverse proxy 312 obtains these network routing addresses and provides them to second sub-system 320, which can store the addresses to access log 322. The network routing addresses stored in access log 322 can be used by correlation engine 326 for performing application-independent access control, as described in more detail below.

As described above, reverse proxy 312 of first sub-system 310 can receive a user request from a client computing device. A user request can be for performing a task using an application accessible or available in cloud-services computing environment 220. For example, reverse proxy 312 may receive an application program interface (API) call to perform a task using a database application available in third sub-system 330. The API call can be a REST call that uses HTTP requests to retrieve a data record (e.g., a GET request), to store a data record (e.g., a PUT request), to generate a new data record (e.g., a POST request), or to remove a data record (e.g., a DELETE request). An application can be a software or program (e.g., software code) that provides cloud-based services and can perform certain functions, tasks, and/or activities. For example, an application can run one or more processes to perform various data manipulation tasks based on the user request (e.g., GET, PUT, POST, DELETE).

In some embodiments, after receiving the user request (e.g., an API call), reverse proxy 312 can forward the user request to third sub-system 330. Third sub-system 330 can be separate from first sub-system 310 and separate from second sub-system 320 (e.g., sub-systems 310, 320, and 330 are separate and distinct virtual machines, as described above). In some embodiments, third sub-system 330 is configured to perform one or more tasks using one or more applications available in cloud-services computing environment 220. For example, third sub-system 330 can include an application virtual machine (application VM) that is configured to initiate and run processes associated with one or more applications. In some examples, the one or more applications operating in third sub-system 330 may not perform access control on their own. Instead, the access control to these applications is performed at second sub-system 320 (e.g., a service VM).

As illustrated in FIG. 3A, the application VM of third sub-system 330 receives the user request for performing a task (e.g., an API call) from the web VM of first sub-system 310. In response to receiving the user request, third sub-system 330 can collect process-related data for performing the task responding to the user request. In some embodiments, to collect process-related data, guest introspection (GI) agents can be installed and/or instantiated in the application VM of third sub-system 330. GI agents can collect data of the processes running on the application VM of third sub-system 330. GI agents can further provide the collected data to the service VM of second sub-system 320. As illustrated in FIG. 3A, the application VM of third sub-system 330 can instantiate and run one or more guest introspection (GI) agents such as a network/system agent 334 and a file agent 338. After receiving the API call, for example, the GI agents detect one or more process-related events for responding to the API call. The GI agents can further collect process-related data based on the detected process-related events. It is appreciated that while FIG. 3A illustrates only one application VM and the GI agents associated with the application VM, multiple application VMs can be instantiated or included in host computing device 300. Each of the multiple application VMs can include, or be installed with, GI agents for detecting process-related events and collecting process-related data. In some embodiments, the GI agents operating on the multiple application VMs can provide the respectively-collected process-related data to one or more service VMs (e.g., the service VM of second sub-system 320) for performing access control. Collecting and providing process-related data are described in more detail below.

As an example shown in FIG. 3A, based on the received user request for performing a task using an application (e.g., a Java application or program), network/system agent 334 can detect an event indicating that a request has been received at the application VM for initiating a process associated with the application (e.g., initiating a process of an application instance 332). Based on the detected event, network/system agent 334 determines the process for performing such a task (e.g., a process of Java application for retrieving a record). Network/system agent 334 further obtains an application name and/or process identification (ID) associated with the determined process. In some embodiments, network/system agent 334 performs the detection of the event and the determination of the process before a process for performing the task using the application actually initiates. As a result, if it is subsequently determined that the task should not to be performed responding to the user request (e.g., the user is not an authorized user or the client computing device is not an authorized device), then a process for performing the task using the application would not be initiated in the first place. Network/system agent 334 operating on the application VM of third sub-system 330 thus enables access control before a process of an application initiates. The access control can thus intercept a user request from an unauthorized user or an unauthorized device. The access control can thereby prevent the initiation of a process associated with an application available in cloud-services computing environment 220. Moreover, the access control does not rely on any particular application (e.g., a Java application), and can be performed at the operation system level.

In some embodiments, as illustrated in FIG. 3A, network/system agent 334 can also obtain network routing addresses associated with the user request. As described above, the user request can be forwarded by reverse proxy 312 of first sub-system 310 to third sub-system 330. The network routing addresses can include at least one of a source IP address, a destination IP address, a source port, a destination port. For example, the source IP address can be the IP address of reverse proxy 312 (e.g., 2.2.2.2) that forwards the user request to the application VM of third sub-system 330; the destination IP address can be the IP address of the application VM (e.g., 3.3.3.3); the source port can be a port of reverse proxy 312 (e.g., port #8080); and the destination port can be a port of the application VM (e.g., port #8000).

As described above, network/system agent 334 collects process-related data such as an application name and/or process identification (ID). Network/system agent 334 can further collect network routing addresses. In some embodiments, network/system agent 334 of the application VM can provide the collected data from third sub-system 330 to the service VM operating in second sub-system 320. As illustrated in FIG. 3A, network/system agent 334 can forward the process-related data (e.g., application name or process ID) and network routing addresses (e.g., IP address and port of reverse proxy 312, IP address and port of application VM of third sub-system 330) from third sub-system 330 to the service VM of second sub-system 320. In some embodiments, the process-related data and network routing addresses can be multiplexed or integrated using a multiplexer 342. Multiplexer 342 can then forward the multiplexed data to an event collector 324 of the service VM of second sub-system 320.

As another example illustrated in FIG. 3A, the GI agents operating in the application VM of third sub-system 330 can also include a file agent 338 configured to detect process-related events. For example, based on a received API call (e.g., a call for performing a task of retrieving, editing, writing, or deleting a data record using a Java application), file agent 338 can detect an event indicating that a request has been received at the application VM for accessing at least a portion of a data object (e.g., a data file stored in database/file system 336), which is used by a process of the Java application. In some embodiments, database/file system 336 can be a virtual disk or a storage element. Based on the detected event, file agent 338 identifies at least a portion of the data object associated with the process of the Java application. For example, file agent 338 identifies that to perform the task responding to the API call, the process of the Java application needs to access a data file with a name SSN_file.txt. In some embodiments, file agent 338 performs the detection of the event and the determination of the data object before the data object is accessed (e.g., before the data object is actually retrieved, edited, or otherwise accessed by the process of the Java application). As a result, if it is subsequently determined that the task should not to be performed responding to the user request (e.g., the user is not an authorized user or the client computing device is not an authorized device), the data object would not be accessed by the Java application in the first place. File agent 338 operating in the application VM of third sub-system 330 thus enables access control before a data object (e.g., a database, a file) is accessed. Such access control thus does not rely on any particular application (e.g., a Java application) and can be performed at the operation system level.

In some embodiments, as illustrated in FIG. 3A, based on the identified at least a portion of the data object associated with the process of an application (e.g., the data file needed by a process of the Java application), file agent 338 can obtain a representation of the data object. For example, file agent 338 can obtain the file name of the file (e.g., SSN_File.txt) that is needed by a process of a Java application.

In some embodiments, file agent 338 of the application VM can provide the collected data from third sub-system 330 to the service VM operating in second sub-system 320. As illustrated in FIG. 3A, file agent 338 can forward the process-related data (e.g., a file name of a file that is needed by a process of a Java application) from third sub-system 330 to the service VM of second sub-system 320. In some embodiments, the process-related data provided by file agent 338 are first multiplexed or integrated with other process-related data (e.g., data forwarded by network/system agent 334) using multiplexer 342. Multiplexer 342 can then forward the multiplexed data to event collector 324 of the service VM of second sub-system 320.

With reference to FIG. 3A, in some embodiments, multiplexer 342 can be instantiated in a fourth sub-system 340 of host computing device 300. Fourth sub-system 340 can be, for example, a virtual machine, a part of a virtualization layer, or a part of a physical platform of host computing device 300. In some embodiments, fourth sub-system 340 can be a separate sub-system from first sub-system 310, second sub-system 320, and third sub-system 330.

As described above, multiplexer 342 receives process-related data (e.g., an application name and/or process ID, file name, or the like) and network routing addresses (e.g., IP address and port of reverse proxy 312, IP address and port of the application VM). In some embodiments, multiplexer 342 multiplexes the process-related data and network routing addresses. Multiplexer 342 can then transmit the multiplexed data to event collector 324 of the service VM of second sub-system 320. In some embodiments, the process-related data and network routing addresses can be transmitted to event collector 324 without multiplexing. Event collector 324 can store the received data (e.g., multiplexed or non-multiplexed) in a cache, memory, a log file, or any other type of storage. Based on the data received and/or stored by event collector 324 and data received and/or stored in access log 322, a correlation engine 326 of service VM of second sub-system 320 can determine whether a task is to be performed responding to the user request received by the web VM of first sub-system 310.

In some embodiments, to make such a determination, correlation engine 326 can construct a data structure based on a representation of the user identity and the network routing addresses stored in access log 322, and based on the process-related data and the network routing addresses received by event collector 324. FIG. 3B illustrates such a data structure constructed and used by correlation engine 326. As illustrated in FIG. 3B, the data structure can be, for example, a context table 350. To construct context table 350, correlation engine 326 retrieves data from access log 322 (e.g., data provided by reverse proxy 312 of the web VM of first sub-system 310). Correlation engine 326 can organize the retrieved data in one or more entries of the context table 350. As illustrated in FIG. 3B, correlation engine 326 can construct an entry 352 in context table 350 to include, for example, a first source IP address (e.g., IP address of the client computing device such as 1.1.1.1), a first source port (e.g., a port of the client computing device such as 80), a first destination IP address (e.g., the IP address of reverse proxy 312 such as 2.2.2.2), and a first destination port associated with the user request (e.g., a port of reverse proxy 312 such as 443). In entry 352, correlation engine 326 can also include other data such as the user identity (e.g., a user name such as user A) and an indication of the agent that supplies or provides the data (e.g., reverse proxy 312).

Similarly, correlation engine 326 can retrieve data from event collector 324. Collection engine 326 can organize the retrieved data in one or more additional entries of context table 350. As illustrated in FIG. 3B, correlation engine 326 can construct entry 354 of context table 350 to include, for example, a second source IP address (e.g., the IP address of reverse proxy 312 such as 2.2.2.2), a second source port (e.g., a port of reverse proxy 312 such as 8080), a second destination IP address (e.g., the IP address of application VM such as 3.3.3.3), and a second destination port associated with the user request (e.g., a port of an application VM such as 8000). In entry 354, correlation engine 326 can include other data such as the process-related data (e.g., the name of the application such as java.exe) retrieved from event collector 324. In entry 354, correlation engine 326 can also include an indication of the agent that supplies or provides the data in entry 354 (e.g., network/system agent 334).

Similarly, as illustrated in FIG. 3B, correlation engine 326 can construct an additional entry 356 of context table 350. Entry 356 of context table 350 can include, for example, process-related data such as the representation of a data object (e.g., the file name such as SSN_file.exe) and information of the process that needs the data object (e.g., the name of the application such as java.exe). In entry 356, correlation engine 326 can also include an indication of the agent that supplies or provides the data in entry 356 (e.g., file agent 338).

As illustrated in FIG. 3B, context table 350 thus include user identity, process-related data, and network routing addresses. The data entries contained in context table 350 can represent an entire or a substantial portion of the totality of the circumstances associated with the user request for accessing cloud-based services provided by cloud-services computing environment 220. The access control described below can thus be performed using context table 350 based on the totality of the circumstances, thereby enhancing the security of confidential information protection. While context table 350 illustrated in FIG. 3B only includes three entries, it is appreciated that any number of entries can be included. The entries in context table 350 can also be organized in any desired manner.

With reference back to FIG. 3A, in some embodiments, correlation engine 326 obtains an access-control policy (not shown) stored in a cache, memory, or any storage element. Correlation engine 326 can correlate the constructed data structure (e.g., context table 350) to the access-control policy. The access-control policy can be predetermined by a business organization to represent a policy for accessing a cloud-service computing environment. For example, the access-control policy may specify that user A (e.g., an HR employee of the business organization) is allowed to manipulate (e.g., read, edit, write, etc.) a particular data object containing personally identifiable information (PII) (e.g., an SSN file). The access-control policy may further specify that user B (e.g., a non-HR employee of the business organization) is not allowed to access the particular data object. The access-control policy may be stored in correlation engine 326 or obtained from external to correlation engine 326 (e.g., a cache, memory, or a file stored in host computing device 300). Based on the constructed data structure (e.g., context table 350 shown in FIG. 3B) and the predetermined access-control policy, correlation engine 326 can determine whether a task is to be performed according to the user request.

As one example illustrated in FIG. 3B, based on context table 350 and an access-control policy, correlation engine 326 may determine that the user request is made by user A (e.g., user name and password match the record for user A). Correlation engine 326 may further determine that the network routing addresses are all associated with legitimate or authorized devices (e.g., data associated with the user request flows from 1.1.1.1 to 2.2.2.2, then to 3.3.3.3, etc.). Correlation engine 326 may further determine that user A is an authorized user for accessing a file containing PII (e.g., SSN_file.txt) using a Java application. Based on these determinations, correlation engine 326 determines that the task of accessing the file containing PII using a Java application should be performed responding to the user request.

In accordance with a determination that the task is to be performed, correlation engine 326 of the service VM causes the task to be performed using the application. For example, correlation engine 326 of the service VM of second sub-system 320 can transmit a signal to the application VM of third sub-system 330, which then initiates a process associated with the application to perform the task responding to the user request. Correlation engine 326 can also transmit a signal to the application VM of third sub-system 330, which then enables access to at least a portion of a data object used by the process. For example, correlation engine 326 can cause a process of a Java application to be initiated on the application VM of third sub-system 330 and/or allow the process to access the SSN_file.txt file stored in database/file system 336. Thus, after correlation engine 326 makes a determination of whether the task should be performed, the process is caused to be initiated and/or the data object is allowed to be accessed. As a result, the techniques provided in this disclosure facilitates access control before-the-fact. The access control techniques thus enhance the security by eliminating any after-the-fact control (e.g., allowing the user to initiate a process/upload a file first and then control the access) of the access to the cloud-service computing environment 220.

As another example, based on a context table and the predetermined access-control policy, correlation engine 326 may determine that the task of accessing a file containing PII using a Java application should not be performed. For example, correlation engine 326 may determine that the user request is made by user B (e.g., user name and password match the record for user B). Correlation engine 326 may further determine that the network routing addresses are all associated with legitimate or authorized devices (e.g., data associated with the user request flows from 1.1.1.1 to 2.2.2.2, then to 3.3.3.3, etc.). Correlation engine 326 may further determine that user B is not an authorized user for accessing a file containing PII (e.g., SSN_file.txt) using a Java application. Based on these determinations, correlation engine 326 determines that the task of accessing the file containing PII using a Java application should not be performed responding to the user request. In accordance with the determination, correlation engine 326 of the service VM of second sub-system 320 can transmit a signal to the application VM of third sub-system 330, which then prevents the application VM from initiating a process associated with the application to perform the task responding to the user request. Correlation engine 326 can also transmit the signal to the application VM of third sub-system 330, which then denies access to at least a portion of a data object used by the process associated with the application.

As another example, correlation engine 326 may determine that the user identity of another user (e.g., user C) does not match the record of an authorized user. As a result, correlation engine 326 of the service VM of second sub-system 320 can transmit a signal to the web VM of first sub-system 310, which then denies the access to cloud-services computing environment 220 (e.g., deny a log in request made by user C).

In some embodiments, correlation engine 326 can cause the user request to be denied by preventing initiation of a process associated with the application to perform the task and/or by denying access to at least a portion of a data object used by the process associated with the application. For example, correlation engine 326 can transmit a signal to application VM of third sub-system 330 such that a process of the Java application would not be initiated and/or the database/file system 336 would not be accessed. As another example, correlation engine 326 can transmit a signal to application VM of third sub-system 330 such that a user request for uploading/downloading a data object is denied before the data object is actually uploaded/downloaded. Thus, because the user request is denied before any process is initiated and/or any data object is accessed or uploaded/downloaded, the techniques described in this application facilitate access control before-the-fact. The techniques that enhance the security by eliminating any after-the-fact control (e.g., allowing the user to initiate a process and/or upload/download a file first and then control the access) of the access to the cloud-service computing environment 220.

As described above, correlation engine 326 of the service VM can determine whether the task is to be performed based on a totality of the circumstances by taking into consideration of the user identity, the process-related data, and the network routing addresses. The data can be obtained and collected by the reverse proxy 312 at the web VM and/or by the GI agents (e.g., network/system agent 334 and the file agent 328) at the application VM. The determination is then made by correlation engine 326 at a separate and distinct service VM. As a result, the access control is not performed by each individual application and is thus application independent. Further, the access control does not rely on the access-control logic implemented by each individual application. Relying on each individual application to control the access would necessitate the initiating of a process of the application even if the user request to access an application is later determined to be not authorized. The techniques described above therefore effectively reduce or eliminate after-the-fact type of access control, because the access control is performed before any process can be initiated or any data object can be accessed responding to the user request.

Moreover, as illustrated in FIG. 3A, the access control can be performed by a service VM that is separate and distinct from the application VM. As a result, access control can be performed at the operating system level independent of applications. Performing the access control at the operating system level of host computing device 300 enables controlling access for any number of application VMs. For example, GI agents (e.g., network/system agent and file agent) can be installed or instantiated in all application VMs of host computing device 300. The service VM can then collect data for correlation using the GI agents installed in all the application VMs and provide access control services to all application VMs.

Further, while FIG. 3A illustrates a single host computing device 300 in cloud-services computing environment 220, it is appreciated that cloud-services computing environment 220 (e.g., a data center) can include multiple host computing devices having one or more service VMs for controlling the access to one or more application VMs. For example, each host computing device in cloud-services computing environment 220 can have its own service VM for controlling access to applications available on multiple application VMs of the host computing device. In some examples, multiple host computing devices can share a service VM for controlling access to applications available on multiple application VMs running on the multiple host computing devices. As a result, the techniques described above facilitate global or centralized access control and enforcement, rather than controlling access by each individual application at each individual VM. This not only improves the protection of confidential information, but also significantly enhances overall operational efficiency of the systems in the cloud-services computing environment.

FIG. 4A illustrates a flowchart of an exemplary process 400 for application-independent access control in a cloud-services computing environment, in accordance with some embodiments. Process 400 is performed, for example, using a host computing device operating in the cloud-services computing environment having one or more processors and memory (e.g., host computing device 100/300 and cloud-services computing environment 220 described above). In some embodiments, the operations of processes 400 are distributed across the various components or sub-systems (e.g., the web VM, the application VM, and the service VM) operating on the host computing device. In processes 400, some blocks are, optionally, combined, the order of some blocks is, optionally, changed, and some blocks are, optionally, omitted. In some embodiments, additional operations may be performed in combination with processes 400.

At block 402, a user identity for accessing the cloud-services computing environment is obtained at a first sub-system of a host computing device. For example, as described above with reference to FIG. 3A, a first sub-system of the host computing device (e.g., a web VM) receives user identity such as user credentials for accessing the cloud-services computing environment from a client computing device; and forwards a representation of the user credentials from the first sub-system to a second sub-system of the host computing device.

At block 404, a user request to perform a task using an application is received. The application is configured to be accessed in the cloud-services computing environment. For example, as described above with reference to FIG. 3A, the first sub-system of the host computing device (e.g., a web VM) receives a user request such as an application program interface (API) call to perform the task using the application; and forwards the API call to a third sub-system of the host computing device.

At block 406, in response to receiving the user request, process-related data for performing the task using the application are collected. For example, as described above with reference to FIG. 3A, the third sub-system of the host computing device (e.g., an application VM) receives an application program interface (API) call from the first sub-system; detects one or more process-related events; and collects process-related data based on the detected one or more process-related events. The process-related data can be a process identification or a data object identification.

At block 408, one or more network routing addresses such as source IP addresses and destination IP addresses are obtained. The network routing addresses can include, for example, a source IP address, a destination IP address, a source port, a destination port associated with the user request.

At block 410, whether the task is to be performed is determined based on the user identify, the process-related data, and the one or more network routing addresses. The determination is performed at a second sub-system separate from a third sub-system configured to perform the task using the application. For example, as described above with reference to FIG. 3A, the correlation engine of the second sub-system (e.g., the service VM) constructs a data structure based on a representation of the user identity, the process-related data, and the one or more network routing addresses; obtains an access-control policy; correlates the data structure to the access-control policy; and determines, based on a correlation result, whether the task is to be performed using the application.

At block 412, if it is determined that the task is to be performed, the task is caused to be performed using the application. For example, as described above with reference to FIG. 3A, if it is determined that the task is to be performed responding to the user request, a process associated with the application to perform the task is initiated; and/or the access to at least a portion of a data object used by the process associated with the application is enabled.

Figure 4B:
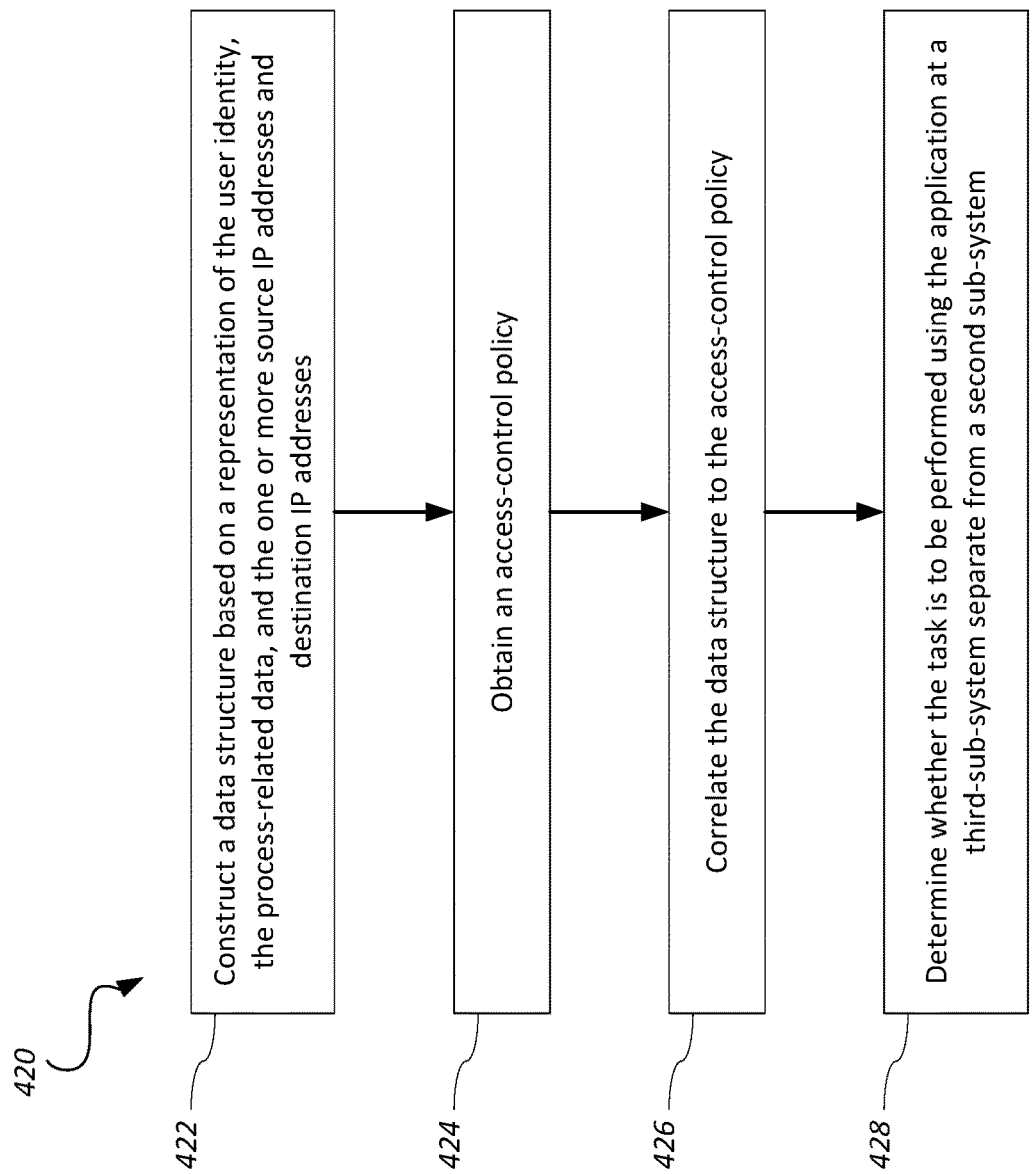

At block 414, in accordance with a determination that the task is not to be performed, the user request is denied. For example, as described above with reference to FIG. 3A, if it is determined that the task is not to be performed responding to the user request, initiating of a process associated with the application to perform the task is prevented; and/or the access to at least a portion of a data object used by the process associated with the application is denied. In some examples, if it is determined that the task is not to be performed responding to the user request, a user request for uploading of a data object to the cloud-services computing environment is denied. The denying is performed prior to receiving the data object. FIG. 4B illustrates a flowchart of an exemplary process 420 for determining whether a task is to be performed, in accordance with some embodiments. Process 420 can be performed by a correlation engine (e.g., correlation engine 326 shown in FIG. 3A). As shown in FIG. 4B, at block 422, a data structure is construed based on a representation of the user identity, the process-related data, and the one or more source IP addresses and destination IP addresses. At block 424, an access-control policy is obtained. At block 426, the data structure is correlated to the access-control policy. For example, a context table as shown in FIG. 3B can be correlated to the access-control policy. At block 428, based on a result of correlating the data structure to the access-control policy, whether the task is to be performed is determined. The task is to be performed using the application at the third sub-system separate from the second sub-system.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method for application-independent access control in a cloud-services computing environment, the method comprising:
   at a host computing device configured to operate in the cloud-services computing environment having one or more processors and memory:
      obtaining, at a web virtual machine that is running in the host computing device and provides an interface for data communication between the cloud-services computing environment and devices external to the cloud-services computing environment, a user identity for accessing the cloud-services computing environment from a device external to the host computing device;
      forwarding the obtained user identity to an access control virtual machine that is running in the host computing device separately from the web virtual machine and configured to perform application-independent access control in the cloud-services computing environment;
      receiving a user request to perform a task using an application, wherein the application is executed in an application virtual machine running in the host computing device separately from the web virtual machine and the access control virtual machine, and configured to be accessed in the cloud-services computing environment;
      in response to receiving the user request at the application virtual machine:
         collecting, by an agent in the application virtual machine, process-related data for a particular process used by the application to perform the task, wherein the process-related data comprises a process identifier; and
         obtaining network routing addresses comprising one or more source IP addresses and one or more destination IP addresses; and
         providing the process-related data and the network routing addresses from the application virtual machine to the access control virtual machine, said providing the process-related data and the network routing addresses comprising:
            forwarding the process-related data and the network routing addresses from the application virtual machine to a virtual multiplexer that is running in the host computing device separately from the web virtual machine, the application virtual machine, and the access control virtual machine;
            multiplexing the process-related data and the network routing addresses at the virtual multiplexer; and
            forwarding multiplexed data of the process-related data and the network routing addresses to the access control virtual machine;
      prior to initiation of the particular process for performing the task, determining, based on the user identity, the process-related data, and the one or more source IP addresses and the one or more destination IP addresses, whether the task is to be performed, wherein the determining is performed at the access control virtual machine, the determining comprising:
         constructing a data structure based on a representation of the user identity, the process-related data, and the one or more source IP addresses and destination IP addresses;
         obtaining an access-control policy; and
         correlating the constructed data structure to the access-control policy; and
      in accordance with a determination that the task is to be performed, initiating the particular process causing the task to be performed at the application virtual machine.

2. The method of claim 1, wherein receiving the user request to perform a task using the application comprises:
   at the web virtual machine, wherein the web virtual machine is configured to receive user requests from one or more client computing devices external to the cloud-services computing environment,
   receiving an application program interface (API) call to perform the task using the application; and
   forwarding the API call to the application virtual machine.

3. The method of claim 1, wherein collecting the process-related data for performing the task comprises:
   at the application virtual machine,
      receiving an application program interface (API) call from the web virtual machine;

in response to receiving the API call, detecting one or more process-related events; and
collecting the process-related data based on the detected one or more process-related events.

4. The method of claim 3, wherein the one or more process-related events comprise at least one of:
an event indicating a request for initiating a process of the application; and
an event indicating a request for accessing at least a portion of a data object associated with the process of the application.

5. The method of claim 3, wherein collecting the process-related data based on the detected one or more process-related events comprises:
determining a process for performing the task using the application; and
obtaining a process identification associated with the determined process.

6. The method of claim 3, wherein collecting the process-related data based on the detected one or more process-related events comprises:
identifying at least a portion of a data object associated with a process for performing the task using the application; and
obtaining a representation of the data object associated with the process for performing the task using the application.

7. The method of claim 3, further comprising:
forwarding the process-related data from the application virtual machine to the access control virtual machine.

8. The method of claim 1, further comprising:
obtaining one or more source ports and one or more destination ports associated with the user request.

9. The method of claim 1, wherein determining whether the task is to be performed comprises:
at the access control virtual machine,
constructing the data structure based on a representation of the user identity, the process-related data, and the one or more source IP addresses and destination IP addresses as data entries in a context table that represents a totality of circumstances associated with the user request; and
determining, based on a result of correlating the data structure to the access-control policy, whether the task is to be performed.

10. The method of claim 1, wherein causing the task to be performed comprises at least one of:
initiating a process associated with the application to perform the task; and
enabling access to at least a portion of a data object used by the process associated with the application.

11. The method of claim 1, further comprising in accordance with a determination that the task is not to be performed, denying the user request.

12. The method of claim 11, wherein denying the user request comprises at least one of:
preventing initiating of a process associated with the application to perform the task; and
denying access to at least a portion of a data object used by the process associated with the application.

13. The method of claim 11, wherein denying the user request comprises:
denying a user request for uploading of a data object to the cloud-services computing environment, wherein the denying is performed prior to receiving the data object.

14. The method of claim 1, wherein the virtual multiplexer is in a virtual machine running in the host computing device separately from the web virtual machine, the application virtual machine, and the access control virtual machine.

15. The method of claim 1, wherein the obtained user identity is forwarded to the access control virtual machine without being multiplexed.

16. A host computing device operating in the cloud-services computing environment, the host computing device comprising:
one or more processors; and
memory storing one or more programs configured to be executed by the one or more processors, the one or more programs including instructions for:
obtaining, at a web virtual machine that is running in the host computing device and provides an interface for data communication between the cloud-services computing environment and devices external to the cloud-services computing environment, a user identity for accessing the cloud-services computing environment;
forwarding the obtained user identity to an access control virtual machine that is running in the host computing device separately from the web virtual machine and configured to perform application-independent access control in the cloud-services computing environment;
receiving a user request to perform a task using an application, wherein the application is executed in an application virtual machine running in the host computing device separately from the web virtual machine and the access control virtual machine, and configured to be accessed in the cloud-services computing environment;
in response to receiving the user request at the application virtual machine:
collecting, by an agent in the application virtual machine, process-related data for a particular process used by the application to perform the task, wherein the process-related data comprises a process identifier; anti-
obtaining network routing addresses comprising one or more source IP addresses and one or more destination IP addresses; and
providing the process-related data and the network routing addresses from the application virtual machine to the access control virtual machine, said providing the process-related data and the network routing addresses comprising:
forwarding the process-related data and the network routing addresses from the application virtual machine to a virtual multiplexer that is running in the host computing device separately from the web virtual machine, the application virtual machine, and the access control virtual machine;
multiplexing the process-related data and the network routing addresses at the virtual multiplexer; and
forwarding multiplexed data of the process-related data and the network routing addresses to the access control virtual machine;
prior to initiation of the particular process for performing the task, determining, based on the user identity, the process-related data, and the one or more source IP addresses and the one or more destination IP addresses, whether the task is to be performed, wherein the determining is performed at the access control virtual machine, the determining comprising:

constructing a data structure based on a representation of the user identity, the process-related data, and the one or more source IP addresses and destination IP addresses;
obtaining an access-control policy; and
correlating the constructed data structure to the access-control policy; and
in accordance with a determination that the task is to be performed, initiating the process causing the task to be performed at the application virtual machine.

17. The host computing device of claim 16, wherein collecting the process-related data for performing the task using the application comprises:
at the application virtual machine,
receiving an application program interface (API) call from the web virtual machine;
in response to receiving the API call, detecting one or more process-related events; and
collecting the process-related data based on the detected one or more process-related events.

18. The host computing device of claim 16, wherein determining whether the task is to be performed comprises:
at the access control virtual machine,
constructing the data structure based on a representation of the user identity, the process-related data, and the one or more source IP addresses and destination IP addresses as data entries in a context table that represents a totality of circumstances associated with the user request; and
determining, based on a result of correlating the data structure to the access-control policy, whether the task is to performed.

19. A non-transitory computer-readable storage medium storing one or more programs configured to be executed by a host computing device operating in a cloud services computing environment having one or more processors and memory, the one or more programs including instructions for:
obtaining, at a web virtual machine that is running in the host computing device and provides an interface for data communication between the cloud-services computing environment and devices external to the cloud-services computing environment, a user identity for accessing the cloud-services computing environment from a device external to the host computing device;
forwarding the obtained user identity to an access control virtual machine that is running in the host computing device separately from the web virtual machine and configured to perform application-independent access control in the cloud-services computing environment;
receiving a user request to perform a task using an application, wherein the application is executed in an application virtual machine running in the host computing device separately from the web virtual machine and the access control virtual machine, and configured to be accessed in the cloud-services computing environment;
in response to receiving the user request at the application virtual machine:
collecting, by an agent in the application virtual machine, process-related data for a particular process used by the application to perform the task, wherein the process-related data comprises a process identifier;
obtaining network routing addresses comprising one or more source IP addresses and one or more destination IP addresses; and
providing the process-related data and the network routing addresses from the application virtual machine to the access control virtual machine, said providing the process-related data and the network routing addresses comprising:
forwarding the process-related data and the network routing addresses from the application virtual machine to a virtual multiplexer that is running in the host computing device separately from the web virtual machine, the application virtual machine, and the access control virtual machine;
multiplexing the process-related data and the network routing addresses at the virtual multiplexer; and
forwarding multiplexed data of the process-related data and the network routing addresses to the access control virtual machine;
prior to initiation of the particular process for performing the task, determining, based on the user identity, the process-related data, and the one or more source IP addresses and the one or more destination IP addresses, whether the task is to be performed, wherein the determining is performed at the access control virtual machine, the determining comprising:
constructing a data structure based on a representation of the user identity, the process-related data, and the one or more source IP addresses and destination IP addresses;
obtaining an access-control policy; and
correlating the constructed data structure to the access-control policy; and
in accordance with a determination that the task is to be performed, initiating the particular process causing the task to be performed at the application virtual machine.

20. The computer-readable storage medium of claim 19, wherein collecting process-related data for performing the task comprises:
at the application virtual machine,
receiving an application program interface (API) call from the web virtual machine;
in response to receiving the API call, detecting one or more process-related events; and
collecting the process-related data based on the detected one or more process-related events.

21. The computer-readable storage medium of claim 19, wherein determining whether the task is to be performed comprises:
at the access control virtual machine,
constructing the data structure based on a representation of the user identity, the process-related data, and the one or more source IP addresses and destination IP addresses as data entries in a context table that represents a totality of circumstances associated with the user request; and
determining, based on a result of correlating the data structure to the access-control policy, whether the task is to performed.

* * * * *